UNITED STATES PATENT OFFICE.

JAMES MASON, OF EYNSHAM HALL, NEAR WITNEY, ENGLAND.

IMPROVEMENT IN TREATING BURNT PYRITES.

Specification forming part of Letters Patent No. 210,619, dated December 10, 1878; application filed February 11, 1878.

*To all whom it may concern:*

Be it known that I, JAMES MASON, of Eynsham Hall, near Witney, in the county of Oxford and Kingdom of England, have invented improvements in the treatment of certain residues resulting from the production of sulphuric acid, of which the following is a specification:

This invention relates to the treatment and use of certain metallic residues which result when iron pyrites containing copper are submitted to a burning or calcining process in and for the production of sulphuric acid, such residues resulting either from the before-mentioned treatment of the crude or natural pyrites or from pyrites containing copper; and the first part of my invention consists in first subjecting the burnt ore in its residual condition, without having been previously subjected to pulverization or to disintegration, to the action of a solvent of the soluble salts of copper contained therein—such, for example, as water or of water acidulated either with hydrochloric or with sulphuric acid—and, after having effected the extraction of the compounds of copper which by burning have been converted into a soluble form, submitting the residues thus treated to a process of calcination, in order that the whole, or practically the whole, of the residual sulphur which may be contained in the residue may be expelled, and the residue, in its undivided condition, be rendered directly available for the production of iron or steel either in the blast or in any other furnace.

The second part of my invention consists in first subjecting the burnt ore, such as before mentioned, in its residual condition, without having been previously subjected to pulverization or to disintegration, to the action of a solvent of the soluble salts of copper contained therein—such, for example, as water or of water acidulated either with hydrochloric or with sulphuric acid—and, after having effected the extraction of such compounds of copper which by burning have been converted into a soluble form, submitting the residues thus treated, either alone or in conjunction with salt, to a process of calcination, by preference at a low temperature, in order that the residual compounds of copper which by burning have not been rendered soluble in the solvents before mentioned may, in part or entirely, be rendered soluble therein. The ore, after calcination and the extraction by the before-mentioned solvents of any copper compounds which may have been rendered soluble, is then to be submitted to calcination, in order that the whole, or practically the whole, of the residual sulphur which may be contained in the residue may be expelled, and the residue, in its undivided condition, be rendered directly available for the production of iron or steel either in the blast or in any other furnace.

I may mention that, in practice, the residues I prefer operating upon are those which result from the burning of pyrites containing, on an average, from about one-half to about two per cent of copper, as I have found that such residues, when treated by either of the before-mentioned processes, give good results; but residues containing other proportions of copper may be employed.

What I claim as my invention is—

1. The treatment of the residues or residual products resulting from the burning of iron pyrites containing copper, herein referred to, so as to render them suitable for the production of iron and steel, by first submitting such residues, without previous disintegration, to the action of either water or of water acidulated with either sulphuric or with hydrochloric acid, in order to effect the separation of any salts or compounds of copper which may be soluble therein, and then submitting the burnt ore thus treated, without previous disintegration, to a heating or calcining process, in order that any sulphur contained therein may be entirely, or practically entirely, expelled.

2. The treatment of the residues or residual products resulting from the burning of iron pyrites containing copper, herein referred to, so as to render them suitable for the production of iron and steel, by first submitting such residues, without previous disintegration, to the action of either water or of water acidulated with either sulphuric or with hydrochloric acid, in order to effect the separation of any salts or compounds of copper which may be soluble therein, and then submitting such residues to a calcining process, either alone or in conjunction with salt, by preference at a low temperature, in order that a further proportion of the compounds of copper may be rendered soluble, and, after such compounds have been separated by any of the solvents before mentioned, submitting the residue thus treated to a further heating or calcining process, in order that the sulphur contained therein may be entirely, or practically entirely, expelled.

In witness whereof I have signed my name to this specification in the presence of two subscribing witnesses.

JAMES MASON.

Witnesses:
 CHAS. MILLS,
  47 Lincoln's Inn Fields, London.
 HENRY DOWNING,
  47 Lincoln's Inn Fields, London.